United States Patent
Gullickson et al.

(10) Patent No.: US 10,267,133 B2
(45) Date of Patent: Apr. 23, 2019

(54) SYSTEMS AND METHODS FOR FRACTURING A SUBTERRANEAN FORMATION

(71) Applicant: Halliburton Energy Services, Inc., Houston, TX (US)

(72) Inventors: Geoffrey Wedell Gullickson, Denver, CO (US); William Owen Alexander Ruhle, Denver, CO (US); John Dean Stabenau, Littleton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 161 days.

(21) Appl. No.: 15/253,607

(22) Filed: Aug. 31, 2016

(65) Prior Publication Data

US 2017/0350222 A1 Dec. 7, 2017

(51) Int. Cl.
| | |
|---|---|
| *E21B 43/267* | (2006.01) |
| *E21B 43/26* | (2006.01) |
| *C09K 8/62* | (2006.01) |
| *C09K 8/64* | (2006.01) |
| *C09K 8/66* | (2006.01) |
| *C09K 8/68* | (2006.01) |

(52) U.S. Cl.
CPC .............. *E21B 43/26* (2013.01); *C09K 8/62* (2013.01); *C09K 8/64* (2013.01); *C09K 8/665* (2013.01); *C09K 8/685* (2013.01); *C09K 2208/28* (2013.01)

(58) Field of Classification Search
CPC ...... E21B 43/162; E21B 43/26; E21B 43/267; E21B 47/06
See application file for complete search history.

(56) References Cited

U.S. PATENT DOCUMENTS

| | | | |
|---|---|---|---|
| 5,890,536 A * | 4/1999 | Nierode | E21B 43/006 166/284 |
| 8,905,133 B2 | 12/2014 | Potapenko et al. | |
| 8,978,764 B2 * | 3/2015 | Dusseault | E21B 43/267 166/250.1 |
| 9,145,766 B2 | 9/2015 | Fripp et al. | |

(Continued)

FOREIGN PATENT DOCUMENTS

WO 2015188115 12/2015

OTHER PUBLICATIONS

International Search Report and Written Opinion of PCT Application No. PCT/US2016/036070 dated Feb. 13, 2017: pp. 1-15.

(Continued)

*Primary Examiner* — Kenneth L Thompson
(74) *Attorney, Agent, or Firm* — Chamberlain Hrdlicka

(57) ABSTRACT

Systems and methods for fracturing an interval of a subterranean formation to produce fluid from a reservoir through a wellbore. A treating fluid flows into the wellbore to create fractures in the formation. A flow constraint material is selectively flowed into the wellbore simultaneously with the treating fluid. A parameter of the formation is monitored to determine whether a formation system strain is within a range. When the formation system strain is out of the range, the flow of the flow constraint material is adjusted. The flow constraint material partially constrains the treating fluid from entering a fracture so as to at least partially redistribute the treating fluid to an another fracture or fractures.

23 Claims, 3 Drawing Sheets

(56) References Cited

U.S. PATENT DOCUMENTS

| | | | |
|---|---|---|---|
| 9,915,137 B2 * | 3/2018 | Alekseenko | E21B 43/26 |
| 10,001,003 B2 * | 6/2018 | Dusseault | E21B 43/267 |
| 2006/0185848 A1 | 8/2006 | Surjaatmadja et al. | |
| 2008/0200352 A1 | 8/2008 | Willberg et al. | |
| 2011/0011595 A1 | 1/2011 | Huang et al. | |
| 2012/0024530 A1 | 2/2012 | Todd et al. | |
| 2013/0199787 A1 | 8/2013 | Dale et al. | |
| 2013/0341030 A1 | 12/2013 | Brannon et al. | |
| 2014/0151033 A1 | 6/2014 | Xu | |
| 2014/0290945 A1 | 10/2014 | Potapenko et al. | |
| 2015/0041132 A1 | 2/2015 | Nelson et al. | |
| 2015/0233226 A1 * | 8/2015 | Holzhauser | E21B 43/267 |
| | | | 166/280.1 |
| 2015/0252649 A1 | 9/2015 | Tang | |

OTHER PUBLICATIONS

International Search Report and Written Opinion of PCT Application No. PCT/US2016/036082 dated Feb. 14, 2017: pp. 1-13.

Gomaa et al., SPE-179144-MS "Engineering Solid Particulate Diverter to Control Fracture Complexity: Experimental Study," SPE International, 2016: pp. 1-19.

McCartney et al., SPE-179115-MS "A Family of Unique Diverting Technologies Increases Unconventional Production and Recovery in Multiple Applications—Initial Fracturing, Refracturing, and Acidizing," SPE International, 2016: pp. 1-19.

* cited by examiner

SYSTEMS AND METHODS FOR FRACTURING A SUBTERRANEAN FORMATION

BACKGROUND

This section is intended to provide relevant contextual information to facilitate a better understanding of the various aspects of the described embodiments. Accordingly, it should be understood that these statements are to be read in this light and not as admissions of prior art.

Fracturing techniques are often implemented to stimulate hydrocarbon-producing reservoirs by increasing the system permeability of the reservoir rocks. A fracturing fluid is introduced into the reservoir at a pressure sufficient to break or fracture the reservoir rocks. Particulate solids, e g., proppant particles, are suspended in the fracturing fluid and settle into the fractures to maintain fracture integrity and to create a conductive fracture network within the reservoir rock. The conductive fracture network is an interconnected network of fractures capable of channeling the flow of hydrocarbons from the reservoir rock and into a wellbore.

The conductive fracture network can include generated, dilated, or induced fractures that readily receive the fracturing fluid in order to produce hydrocarbons and can also include fractures that have limited productivity. In this case, the fracturing fluid gravitates towards the path of least resistance, i.e., the generated or dilated fractures with increased permeability. However, to improve the overall permeability of the reservoir, diverter or flow constraint materials may be used to force the flow of the fracturing fluid from the producing fractures and into the fractures with limited productivity. In particular, the diverter material constrains or diverts the fracturing fluid from entering the generated or dilated fractures.

BRIEF DESCRIPTION OF THE DRAWINGS

For a detailed description of the embodiments of the invention, reference will now be made to the accompanying drawings in which.

DETAILED DESCRIPTION

Figure 1A:
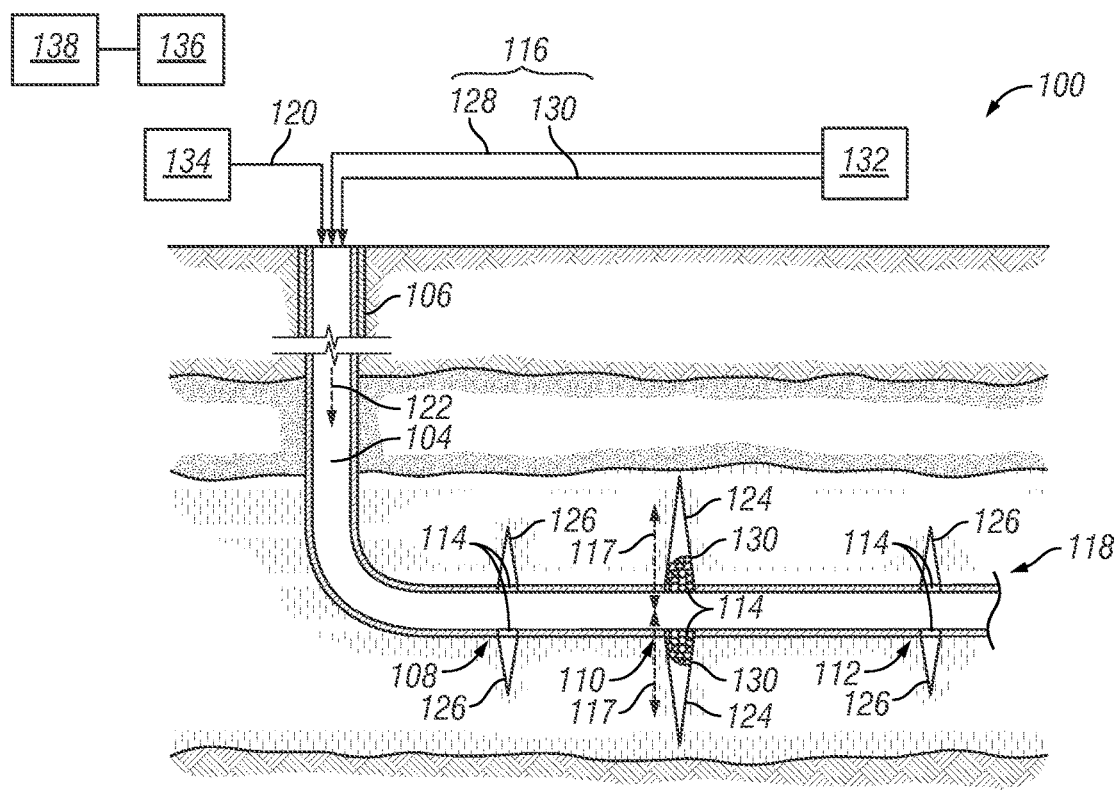
FIG. 1A is a perspective view of an example subterranean formation, according to one or more embodiments.

Referring to FIG. 1A, a perspective view of an example subterranean formation 100 according to one or more embodiments is shown. The formation 100 is composed of porous and permeable rocks that include hydrocarbons, e.g., in a reservoir, located in an onshore environment or in an offshore environment. The formation 100 may be located in the range of a few hundred feet to a few tens of thousands of feet below a ground surface. A wellbore 104 is drilled to penetrate the formation 100 and to allow production of hydrocarbons from the formation 100. The wellbore 104 of FIG. 1A is formed at any suitable angle to reach the hydrocarbon portion of the formation 100. For example, the wellbore 104 can follow a near-vertical, partially-vertical, angled, or even a partially-horizontal path through the formation 100. The wellbore 104 may be lined with a protective lining 106 extending through the formation 100. The protective lining 106 can include a casing, liner, piping, or tubing and is made of any material, including steel, alloys, or polymers, among others. The protective lining 106 of FIG. 1A extends vertically downward and continues horizontally to further extend through the formation 100. In other examples, the wellbore 104 can be completely or partially lined or fully openhole, i.e., without the protective lining.

Hydrocarbons are located in the pore volume space of the formation 100 and may be produced when the pore spaces are connected and permeability, or the ability to transmit fluids, is such that the hydrocarbons flow out of the formation 100 and into the wellbore 104. In some cases, the formation 100 may have low permeability, and the hydrocarbons do not readily flow or production is hampered due to formation damage. Thus, to further stimulate and to extract the hydrocarbons, a reservoir stimulation treatment program is initiated to break, fracture, or induce dilation of existing natural fractures in the rock of the formation 100. The reservoir stimulation treatment program can include perforating the protective lining 106, or installing stimulation specific protective lining equipment, to create formation entry points 114, e.g., perforations, sliding stimulation sleeves, etc. The formation entry points 114 provide a pathway for the hydrocarbons to flow from the formation 100 and into the wellbore 104.

Mechanical isolation and compartmentalization tools can be used such that the formation entry points 114 segment the formation 100 into any number of production zones where fracturing programs can be carried out. As shown in FIG. 1A, the formation 100 includes a first production zone 108, a second production zone 110, and a third production zone 112. Each zone 108, 110, 112 can be stimulated individually or simultaneously with other zones depending on the mechanical isolation and compartmentalization system employed. It should be understood that the number of zones in FIG. 1A is one example embodiment and that a wide variety of other examples, including increasing or decreasing the number of zones in the formation 100, are possible.

The reservoir stimulation treatment program of the embodiments includes injecting a pressurized treating fluid 116 into the wellbore 104 to stimulate one or more of the production zones 108, 110, 112. The treating fluid 116 can be stored in injection equipment 132, such as a storage tank or pipeline. The treating fluid 116 is pumped from the injection equipment 132 and into the wellbore 104 with pressure greater than the fracture gradient or fissure opening pressure of the formation 100. Other suitable programs can be used to flow the treating fluid 116 into the wellbore 104, for example, via a conduit, such as coiled tubing or piping, located within the wellbore 104. As the treating fluid 116 flows through the formation entry points 114, the increased pressure created by the flowing treating fluid 116 cracks the formation 100 to create or further widen a network of fractures 118. The network of fractures 118 of FIG. 1A may include high flow capacity fractures 124 and low flow capacity fractures 126. The high flow capacity fractures 124 are located in lower relative total stress areas of the stimulation interval where fluids from a conventional hydraulic fracturing treatment can be injected with little or no mechanical manipulation. The low flow capacity fractures 126 are located in higher relative total stress areas where little to no fluids from a convention hydraulic fracturing treatment would be injected without mechanical manipulation.

The treating fluid 116 includes a carrier fluid, i.e., a fracturing fluid 128, and may also include a stimulation material 130 at times. The fracturing fluid 128 can include energized or non-energized water, brine, gels, cross-linked fluids, mineral or organic acids, non-aqueous based fluids, or any other type of fluids capable of fracturing the formation 100 and transporting the stimulation material 130 into the fractures 124, 126. The stimulation material 130 is suspended in the fracturing fluid 128 and settles into the high flow capacity fractures 124, or low flow capacity fractures 126 to hold the fractures open so as to permit the flow of hydrocarbons from the reservoir and into the wellbore 104. The stimulation material 130 can include proppant, such as small spheres composed of sand, ceramic material, plastics, and resins, or other conductivity enhancement materials.

The treating fluid 116 may also include additives to optimize the fracturing program. The types of additives used can vary depending on the properties of the formation 100 and the composition of the treating fluid 116, among other factors. In particular, the additives can include stabilizers, surfactants, foamers, gel breakers, fluid loss additives, friction reducers, scale inhibitors, biocides, and pH control additives, and the like. In the embodiments, an additive (i.e., a flow constraint material (FCM) 120) can be stored in FCM injection equipment 134 to be injected into the wellbore 104. Accordingly, the FCM 120 can flow simultaneously with the treating fluid 116 into the wellbore 104. The FCM 120 can be a particulate, rheological, or chemical additive that partially constrains or redistributes the flow of the treating fluid 116 to a higher relative stress area, e.g., the low flow capacity fractures 126, without completely diverting the fluid 116 from the lower total stress area, e.g., the area where the high flow capacity fractures 124 are located.

In operation, the reservoir stimulation treatment program includes multiple cycles of injecting the treating fluid 116. As used herein, a cycle can be considered as an initiation or repetition of a treating fluid 116 or stimulation material 130 design schedule. A cycle can be concluded by a stimulation material 130 change, a treating fluid 116 rheological change, addition of FCM 120, a full wellbore flush upon completion of the designed interval mass balance of the fracturing fluid 128 and stimulation material 130, or a combination of multiple design effects signaling a new or repeated stimulation design impetus. As such, there may also be cycles that do not include the FCM 120. A program for a stimulation interval may include multiple cycles until the injection of the treating fluid 116 and the stimulation material 130 for a production zone is completed. The reservoir stimulation treatment schedule is then concluded with a full wellbore flush upon completion of the designed interval mass balance of the fracturing fluid 128 and stimulation material 130. A wellbore flush may be considered a total volumetric displacement of the wellbore and the flush fluid may include water and/or other chemicals (e.g., hydrochloric acid (HCl)).

Initially in a program, an optional flush of the wellbore 104 using a flush fluid may be performed to displace any debris or other solids before flowing the treating fluid 116, stimulation material 130, or FCM 120 into the wellbore 104.

After the optional initial flush, a first cycle is initiated by injecting the treating fluid, including the fracturing fluid 128, into the wellbore 104 with or without the stimulation material 130. The pressure exerted by the fracturing fluid 128 initiates and propagates the fractures and the flow of the fracturing fluid 128 is maintained during the entirety of the reservoir stimulation cycle.

The stimulation material 130 may be added into the wellbore 104 to commingle with the flowing fracturing fluid 128. In some cases, the stimulation material 130 can flow into the wellbore 104 with the initial flow of the fracturing fluid 128, as previously discussed. While the treating fluid 116 is flowing, the FCM 120 may be introduced into the treating fluid 116 at a surface location of the wellbore 104. The FCM 120 may be introduced either simultaneously with, or segregated from, the stimulation material 130 and can be pulsed or batch blended into the wellbore 104. If flowed together, the FCM 120, the fracturing fluid 128, and the stimulation material 130 commingle together to form a slurry 122 that flows within the wellbore 104 at a cumulative flow rate, i.e., a full job rate. Additionally, another flow of the stimulation material 130 can start prior to displacing or delivering the FCM 120 to the high flow capacity fractures 124 (i.e., an active reservoir stimulation target).

The FCM 120 can flow into the wellbore 104 with the treating fluid 116 throughout multiple cycles without subsequently performing a full wellbore flush, i.e., full volumetric wellbore displacement, until the full mass balance of the slurry 122 into each zone 108, 110, 112 has occurred. Delaying the full wellbore flush improves operational and surface efficiencies since the progression of the FCM 120 (i.e., generated bottom-hole pressure responses) can be monitored without delay due to a reduction in the job rate. In general, the flow of the slurry 122 at a full job rate can ensure that the low flow capacity fractures 126 of the formation 100 are thus generated or dilated to a substantial capacity.

A monitoring unit 136 can be located above ground, as shown in FIG. 1A, or within the wellbore 104 to monitor the progression of the FCM 120. The monitoring unit 136 includes sensors to capture data related to the FCM 120, including parameters (e.g., input timing, dimensions, distribution, flow rate, etc.) associated with the FCM 120, and/or the parameters of the formation 100. The data is captured via a cable, acoustic signals, or electrical pulses, among other communication means. In some examples, the monitoring unit 136 can capture and transmit the data in real-time or include a storage unit to store the data. The monitoring unit 136 can transmit the data to a control unit 138 that is communicatively connected. The control unit 138 may include a computer, or the like, for controlling the injection equipment 132 and the FCM injection equipment 134 to control the parameters of the FCM 120 and/or the formation 100 and for online and offline processing of the data received from the monitoring unit 136, among other features.

Typical injection of a diversion additive provides total diversion of the slurry 122 from the high flow capacity fractures 124 and into the low flow capacity fractures 126. Such total diversion can completely prevent the slurry 122 from flowing into the high flow capacity fractures 124, and reduces stimulation effectiveness. However, the FCM 120 is injected to land at a near wellbore region 117, i.e., region of the formation 100 surrounding the wellbore 104. In particular, the FCM 120 lands, or settles, at the near wellbore region 117 to only partially constrain or hinder the treating fluid 116 from flowing into the high flow capacity fractures 124.

The parameters (e.g., input timing, dimensions, distribution, flow rate, etc.) associated with the FCM 120 and/or formation 100 can be monitored and controlled to generate the partial flow constraint of the treating fluid 116 at the near wellbore region 117. For example, the parameters are monitored, via the monitoring unit 136, to control backpressure as the FCM 120 lands at the near wellbore region 117. The controlling of the backpressure partially constrains and redistributes a portion of the treating fluid 116 from a fracture to another fracture, for example, from the lower relative stress high flow capacity fractures 124 to the higher relative stress low flow capacity fractures 126. The partial constraint of the treating fluid 116 improves the mass balance distribution, or the total volume of the treating fluid 116, distributed across the stimulation interval of wellbore 104. Since the treating fluid 116 is redistributed to flow into the low flow capacity fractures 126, the fracture lengths and widths of the low flow capacity fractures 126 are increased to provide a passageway for hydrocarbons to exit the formation 100 and thus, increase hydrocarbon production.

The flow of the FCM 120 is landed at the near wellbore region 117 and the bottom-hole pressure of the formation 100 is measured via the monitoring unit 136 while continuing to flow the treating fluid 116. The bottom-hole pressure is indicative of the applied stress (e.g., bottom-hole stress) generated to fracture the formation 100. During fracturing of a subterranean formation, geo-mechanical, mechanical, and physical properties of the formation 100 that are measured may include stress and strain, Young's modulus, fracture geometry, and fracture propagation, among others. Such properties of the formation 100 can be influenced by the parameters associated with the treating fluid 116 and additives (e.g., FCM 120) injected into the formation 100 to fracture the formation rock. Thus, the conditions and properties of the formation 100 are monitored to determine how the parameters and characteristics of the treating fluid 116 and additives, among other factors, affect and/or manipulate the formation 116.

To control the stress applied to the formation 100 and to maintain the partial constraining of the treating fluid 116, the parameters of the FCM 120 are controlled to generate a bottom-hole pressure response managed to geo-mechanical conditions identified for fracture generation for dimensional and conductive parameters. For instance, the monitoring unit 136 can monitor the parameters of the FCM 120 and/or the formation 100 to determine if the generated backpressure (i.e., stress) fails to partially constrain and redistribute the treating fluid 116. If the backpressure is insufficient, the monitoring unit 136 can send a signal to the control unit 138 to readjust one or more parameters associated with the FCM 120 and/or the formation 100 in order to initiate or regain partial constraint and redistribution of the treating fluid 116. For example, the control unit 138 may manipulate the input timing for injecting the FCM 120 into the wellbore 104 in order to generate the desired backpressure needed to partially constrain and redistribute the treating fluid 116.

As another example, the Young's modulus is one of several properties of the formation 100 and is the ratio of applied stress (i.e., force applied to a cross-sectional area of the formation 100) to strain (i.e., the deformation of the reservoir rock 102 due to the applied stress). In the embodiments, the Young's modulus is a fixed value based on the characteristics of the formation 100. The Young's modulus and the measured applied stress (i.e., the bottom-hole pressure) may be used to determine the level of strain on the formation 100. Therefore, by manipulating the parameters of the FCM 120 to control the bottom-hole net pressure gain relative to in-situ Young's modulus conditions, a desired cycle-on-cycle formation system strain of about 0 to about 0.0003 or less can be attained and maintained. In the embodiments, a cycle-on-cycle formation system strain of about 0 to about 0.0003 or less lowers fracture flow capacitance overconstraint due to FCM 120 application in maintaining competent stimulation connection to the formation 100 during a stimulation treatment.

If the cycle-on-cycle formation system strain falls within the about 0 to about 0.0003 or less range, the flow of FCM 120 is maintained since the level of partial constraint is achieved. If the cycle-on-cycle formation system strain falls outside of the about 0 to about 0.0003 or less range, the flow of the FCM 120 is modified or eliminated at programmed intervals until the desired parameters are again encountered. For example, the FCM parameters are manipulated to maintain a bottom-hole pressure range within in-situ Young's modulus conditions relating to the desired cycle-on-cycle formation system strain. Accordingly, the number of cycles for flowing the FCM 120 may continue as long as the cycle on cycle system strain is about 0.0003 or less, or until the designed mass balance of the fracturing fluid 128 and stimulation material 130 is achieved.

In other examples, the cycle or cycles used for reservoir stimulation can vary depending on the characteristics of the formation 100 and the type of productivity desired, among other considerations. For example, the flow of the stimulation material 130 can be paused while flowing the fracturing fluid 128 and the FCM 120 into the formation 100. In one or more embodiments and as will be further explained with respect to FIG. 2, the type and number of stimulation materials 130 used can also change or differ (e.g., dimensions, type, etc.). For example, the conductivity of the fractures 124, 126 may be improved by changing the geometry and/or dimensions of the stimulation material 130. Further, the volume of fracturing fluid 128 and the amount of stimulation material 130 can be manipulated before and after landing the FCM 120 to manage the bottom-hole pressure response specific to desired geo-mechanical parameters.

The FCM 120 and the stimulation material 130 can also be used to dehydrate and lower the volume of the fracturing fluid 128 so that the transport efficiency of the fracturing fluid 128 is reduced. When dehydrated, the stimulation material 130 is unable to flow and creates a blockage at the near wellbore region 117, thus, creating a backpressure. Accordingly, the stimulation material 130 that simultaneously flows with the FCM 120 can also be used to limit the transport capabilities of the fracturing fluid 128 so that the amount of FCM 120 required to partially constrain the slurry 122 may be reduced.

Design parameters for flowing the FCM 120 can vary based on the reservoir environment. For example, the fracturing method may include flowing at least one cycle of FCM 120 per fracture zone into the formation 100. In cemented annular isolation primary stimulation applications, a minimum of one (1) cycle may be executed per formation entry point 114 (i.e., sliding stimulation sleeve, perforation cluster, etc.). In uncemented casing, tubing, or liner stimulation applications, a minimum of one (1) cycle may be executed per formation entry point 114 (i.e., sliding stimulation sleeve, perforation cluster, etc.). In an openhole environment without any completion tubulars, the mass balance (e.g., or the total slurry 122 volume) may be segmented into a minimum of four (4) cyclic applications.

To conclude the stimulation program, once the cycles have been completed, i.e., the full mass balance of the slurry 122 into each zone 108, 110, 112 has occurred, a full wellbore flush may be performed. As described above, delaying the full wellbore flush improves operational and surface efficiencies since the progression of the FCM 120 (i.e., external impulse generated bottom-hole pressure responses) can be monitored and/or controlled without delays from full volumetric wellbore displacements. In general, the flow of the slurry 122 at a full job rate can ensure that the low flow capacity fractures 126 are thus generated, dilated, and stimulated to a substantial capacity.

An example treatment program for a production zone may be seen below in Table 1.

TABLE 1

Example of a Reservoir Stimulation Program

| Treating Fluid (gallons "gal") | Stimulation Material (pounds "lb") | Stimulation Material Concentration (lb/gal) | FCM (pounds "lbs") | Slurry Rate (barrels per minute "bpm") |
|---|---|---|---|---|
| 1,000 | 0 | — | 0 | 10 |
| 13,500 | 0 | — | 0 | 60 |
| 2,000 | 1,000 | 0.5 | 0 | 60 |
| 2,000 | 4,000 | 2 | 15 | 60 |
| 1,250 | 650 | 0.5 | 0 | 60 |
| 2,000 | 5,000 | 2.5 | 0 | 60 |
| 2,000 | 4,000 | 2 | 15 | 60 |
| 1,250 | 625 | 0.5 | 0 | 60 |
| 2,000 | 10,000 | 5 | 0 | 60 |
| 500 | 0 | — | 0 | 60 |
| . | . | . | . | . |
| . | . | . | . | . |
| . | . | . | . | . |
| 13,500 | 0 | — | 0 | 0 |

The stimulation program in Table 1 includes multiple cycles, one or more of which includes injecting the treating fluid 116 that includes the fracturing fluid 128 and the stimulation material 130, and the FCM 120 into the wellbore 104. Additionally, Table 1 provides the concentration of the stimulation material 130 in the treating fluid 116 and a slurry rate for the various commingled components that flow into the wellbore 104 for each cycle.

Initially, about 1,000 gal of the treating fluid flushes the wellbore 104 of debris, flowing into the wellbore 104 at a flow rate of about 10 barrels per minute (bpm). The stage volume of treating fluid is then increased, (e.g. 13,500 gal) to provide a steady slurry rate, such as 60 bpm, that can be maintained throughout the stimulation program. In the examples, the treating fluid is continuously injected into the wellbore 104 through the entire reservoir stimulation cycle.

After the initial treating fluid is pumped, the stimulation material 130 flows into the wellbore 104 at a distribution, for example, of about 1,000 lbs (4448.22 N) along with 2,000 gal (7570.824 L) of the treating fluid. In examples, the volume of the treating fluid 116 and the amount of stimulation material 130 may increase, decrease, or remain constant before the FCM 120 is simultaneously or independently launched from a surface location. In the examples, 15 lbs (66.7233 N) of the FCM 120 is injected so as to flow simultaneously with the stimulation material 130 into the wellbore 104.

Thereafter, the flow of the FCM 120 ceases while a bottom-hole (of the wellbore) pressure response is determined, as will be further explained. The measured bottom-hole pressure is both a response to the FCM 120 and the stimulation material 130 landing at a bottom surface of the wellbore 104 and in particular, a measure of the stress and strain exerted upon the formation 100. Depending on the response assessment, the flow of the FCM 120 can restart so as to simultaneously flow with the treating fluid 116. In the examples, treatment fluid application may occur at a reduced volume, e.g., 500 gal (1892.71 L), while ceasing flow of the stimulation material 130 or the FCM 120. In particular, at the reduced volume, a full mass balance of the slurry 122 into each zone 108, 110, and 112 has not occurred. Thus, another flow of the stimulation material 130 can start prior to volumetrically displacing the wellbore 104 prior to delivering the FCM 120 to the high flow capacity fractures 124 or low flow capacity fractures 126 (i.e., an available reservoir stimulation target).

The FCM 120 can flow into the wellbore 104 with the treating fluid 116 throughout multiple cycles without subsequently performing a full wellbore flush, i.e., full wellbore displacement, until the full mass balance of the slurry 122 into each zone 108, 110, 112 has occurred. As shown in Table 1, the full wellbore flush is the last treatment stage that includes flowing 13,500 gal of treating fluid without flowing the FCM 120 or the stimulation material 130 into the wellbore 104.

To conclude the stimulation program, once the cycles have been completed, i.e., the full mass balance of the slurry 122 into each zone 108, 110, 112 has occurred, a full wellbore flush may be performed. As shown in Table 1, the full wellbore flush includes flowing 13,500 gal of flush fluid without flowing the FCM 120 or the stimulation material 130 into the wellbore 104.

It should be clearly understood that the volumes and amounts of the components, as shown in Table 1, are merely one example of a reservoir stimulation treatment program containing cycles composed of stages, and a wide variety of other examples are possible. For example, the stage volume of the treating fluid can range from about 500 gal to about 50,000 gal. The stage amount of stimulation material 130 can range from about 500 lb to about 100,000 lb during a cycle where the concentration of the stimulation material can range from about 0.25 lb/gal to about 6.0 lb/gal. Further, the FCM 120 can range from about 1 lb to about 150 lbs depending on the degree of desired fractional constraint of the high flow capacity fractures 124, or low flow capacity fractures 126. While a continuous slurry rate is shown in Table 1, an increase or a decrease in the slurry rate is possible based on the degree of fracturing that is desired. Accordingly, the scope of this disclosure is not limited at all to the details of the formation 100 described herein and/or depicted in the figures.

Figure 1B:
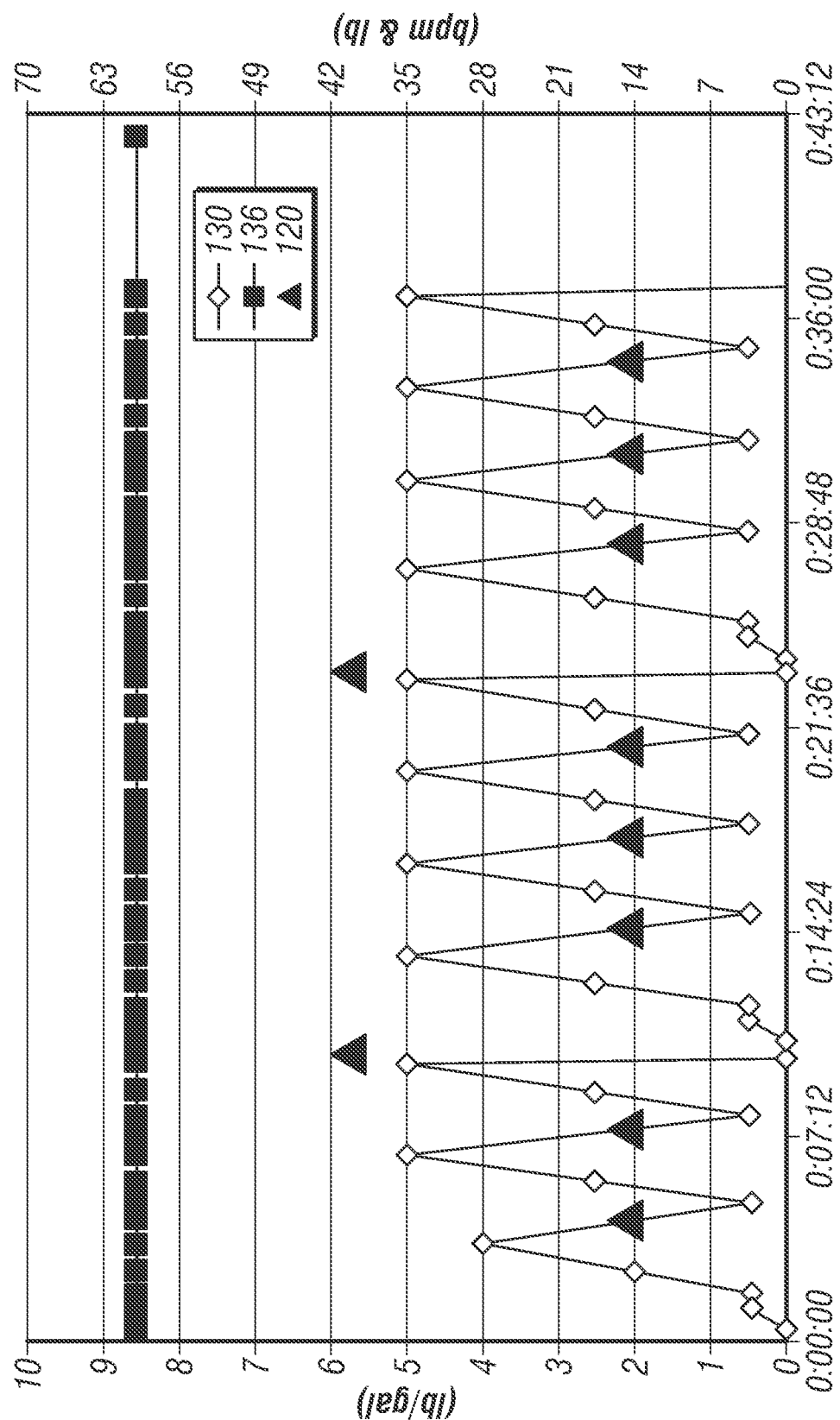
FIG. 1B is a graph of an example reservoir stimulation treatment program, according to one or more embodiments.

The example of a reservoir stimulation interval treatment composed of 11 cycles in graphical form is illustrated in FIG. 1B. A flow rate 136 of the slurry 122 maintains a constant rate of about 60 bpm while the concentration of the stimulation material 130 in the treating fluid 116 varies from about 0 lb/gal, when incorporating an end of interval full wellbore flush, to about 5 lb/gal during normal cycle operations. Based on the need to partially constrain or partially divert the treating fluid 116, about 15 lb of the FCM 120 flows simultaneously with the stimulation material 130. However, when the concentration of the stimulation material 130 drops to between about 0 lb/gal to about 1 lb/gal, the FCM 120 is increased to about 40 lbs to ensure the partially constraining or partial redistribution of the stimulation material 130 from the high flow capacity fractures 124 and into the low flow capacity fractures 126.

The illustrative subterranean formation 100 of FIG. 1A is merely exemplary in nature and various additional components may be present that have not necessarily been illustrated in the interest of clarity. For example, additional components that may be present include, but are not limited to, pumps, monitoring units, injection equipment, sensors, and other well completion and production equipment.

Figure 2:
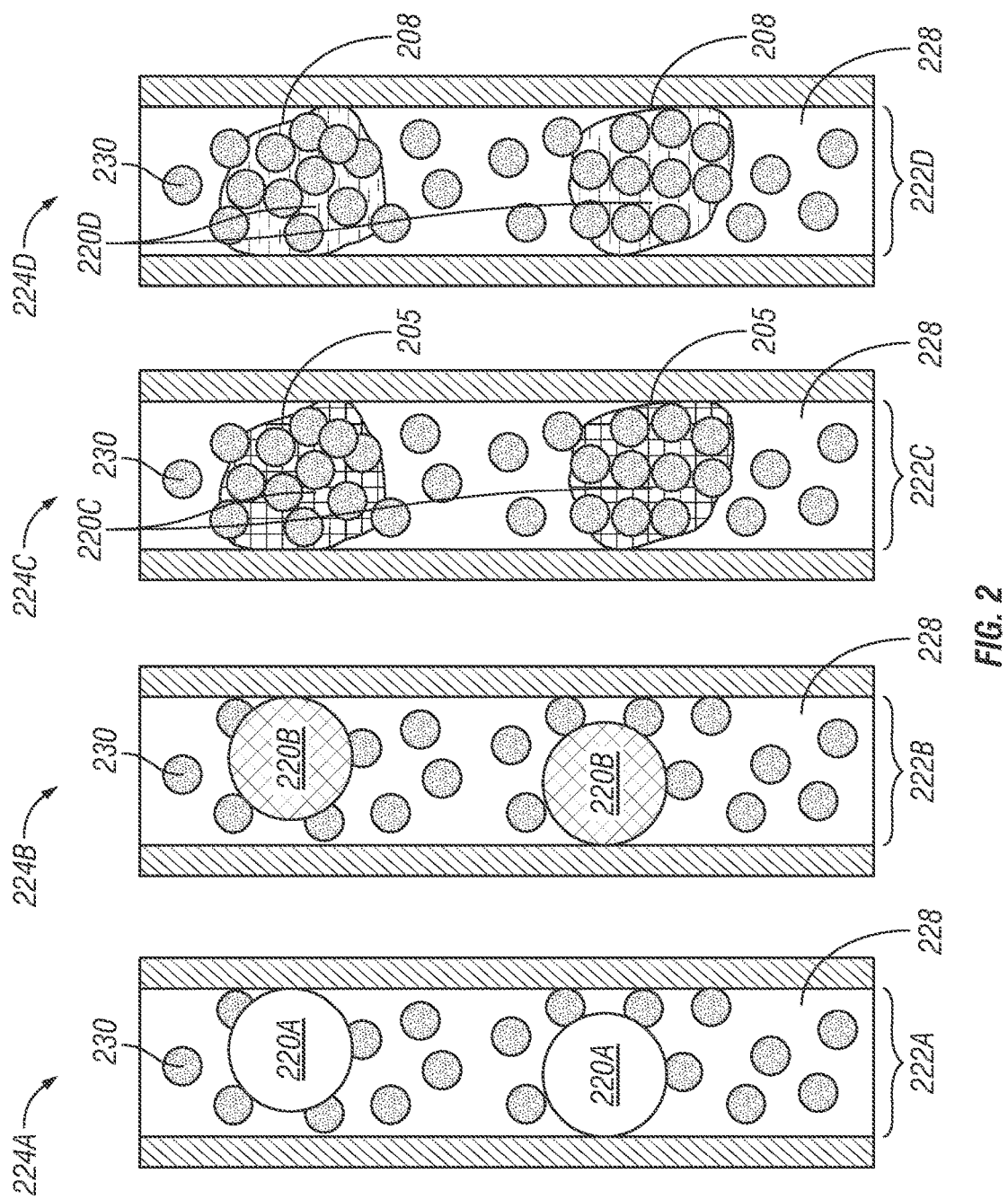
FIG. 2 illustrates distributions of the flow constraint material (FCM) within a fracture, according to one or more embodiments.

FIG. 2 illustrates example distributions of flow constraint material (FCM) 220 within fractures 224A-224D, according to one or more embodiments. The fracture 224A contains a stimulation material 230 and a degradable or a slowly soluble FCM 220A. In particular, the stimulation material 230 is commingled with a variable amount of the FCM 220A in a carrier fluid 228 to form a stimulation treatment slurry 222A. Some examples of the FCM 220A include, but are not limited to, polylactic acid (PLA), benzoic acid, rock salt, anhydrous borate, and other degradable/slowly soluble inorganic and organic materials of different geometries and dimensions.

The fracture 224B contains a stimulation material 230 and a non-degradable FCM 220B. In particular, the stimulation material 230 is commingled with a variable amount of the non-degradable FCM 220B in a carrier fluid 228 to form a stimulation treatment slurry 222B. Some examples of the FCM 220B can include, but are not limited to, larger proppants, walnut hulls, other non-degradable inorganic and organic materials, and all of the above in different geometries and dimensions.

The fracture 224C contains a stimulation material 230 and an FCM 220C, such as a surface treatment agent. In particular, the FCM 220C is pulsed into a carrier fluid 228 containing the stimulation material 230 to create material clusters 205 with the stimulation material 230. The commingled mixture of the carrier fluid 228 and the material clusters 205 form a stimulation treatment slurry 222C. Some examples of the FCM 220C material include, but are not limited to, a non-curable tackifying agent and a curable resin coating.

The fracture 224D contains a stimulation material 230 and an FCM 220D, such as a viscous fluid. The FCM 220D is pulsed into a carrier fluid 228 to create material clusters 208 with the stimulation material 230. The commingled mixture of the carrier fluid 228 and the material clusters 208 form a stimulation treatment slurry 222D. Some examples of the FCM 220D material include, but are not limited to, cross-linked fluids, emulsified fluids, foamed fluids, viscoelastic surfactants, and clay nanoparticle-laden fluids. For ease of understanding, the FCM 220A will be used as an example to further describe the characteristics of the flow constraint material. However, it should be understood that any of the other FCMs 220B-220D could be used.

The particles of FCM 220A can include dimensions greater than the dimensions of the stimulation material 230 where the dimensions of the FCM 220A are based on the dimension selection for the stimulation material 230. For instance, the FCA 220A can include a diameter that is 2, 3, 4, 5 or more times greater than the mean diameter of the stimulation material 230. Yet, the dimensions of the FCM 220A are less than a designed perforation entry hole diameter of a casing or a formation entry point dimension in a wellbore, for example, about 80% of the perforation entry hole diameter or the formation entry point dimension. In the embodiments, the FCM 220A can have a unimodal particle distribution and can also be or include other types of flow constraint materials, or any mixture thereof. For example, the particles of the FCM 220A can have a particle distribution that is unimodal, such that about 75% by volume (vol %) of the particles can have a size distribution of +/− about 840 micrometers (μm) from the mean or average particle size.

The particles of the FCM 220A (e.g., degradable particles) can have an average particle size of about 0.5 mm, about 1 mm, about 2 mm, about 3 mm, or about 4 mm to about 5 mm, about 6 mm, about 7 mm, or about 8 mm. In some examples, the particles of the FCM 220A can have an average particle size of about 0.5 mm to about 8 mm, about 1 mm to about 7 mm, about 2 mm to about 7 mm, about 3 mm to about 6 mm, about 4 mm to about 6 mm, about 4.5 mm to about 6 mm, about 3.5 mm to about 5.5 mm, or about 4.2 mm to about 5.8 mm.

The FCM 220A can have a particle distribution of about 50 vol %, about 60 vol %, about 70 vol %, about 75 vol %, about 80 vol %, about 85 vol %, about 90 vol %, about 95 vol %, or greater of the average particle size. In other examples, the FCM 220A can have a particle distribution of at least 50 vol %, at least 60 vol %, at least 70 vol %, at least 75 vol %, at least 80 vol %, at least 85 vol %, at least 90 vol %, at least 95 vol % of the average particle size. For example, at least 75 vol %, at least 80 vol %, at least 85 vol %, at least 90 vol %, or at least 95 vol % of the particles of the FCM 220A can have an average particle size of about 2 mm to about 8 mm, about 3 mm to about 7 mm, about 4 mm to about 6 mm, about 4.5 mm to about 6 mm, about 4.2 mm to about 5.8 mm, or about 4.16 mm to about 5.84 mm.

In one or more examples, the FCM 220A can include a plurality of degradable particles whereby each of the degradable particles can independently be or include one or more suitable degradable materials. Alternatively, in other examples, the FCM 220A can consist of or consist essentially of a plurality of degradable particles whereby each of the degradable particles can independently be or include one or more suitable degradable materials. The degradable particles and/or the degradable material are capable of undergoing an irreversible degradation downhole. As used herein, the term "irreversible" means that, the degradable particles and/or the degradable material, once degraded downhole, do not recrystallize or reconsolidate while downhole (e.g., the degradable particles and/or the degradable material degrade in situ but do not recrystallize or reconsolidate in situ). As used herein, the terms "degradation" or "degradable" may refer to either or both of heterogeneous degradation (or bulk erosion) and/or homogeneous degradation (or surface erosion), and/or to any stage of degradation in between these two. Not intending to be bound by theory, degradation may be a result of, inter alia, a chemical reaction, a thermal reaction, a reaction induced by radiation, or any combination thereof. In other examples, the FCM can also be or include a plurality of particles that at least consists essentially of or consists of one or more non-degradable material, surface treatment agents, viscous fluids, or any mixture thereof.

The degradable particles of the FCM 220A can be or include, but are not limited to, one or more degradable polymers, one or more anhydrous salts, or a mixture thereof. In one or more embodiments, the degradable particles of the FCM 220A can be or include one or more degradable polymers. The degradable polymer can be or include, but is not limited to, one or more degradable aliphatic polyesters having the formula:

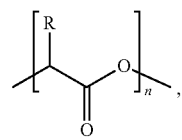

where R can be a hydrogen or a substituted or unsubstituted linear, branched, cyclic, heterocyclic, or aromatic hydrocarbyl group and n can be an integer from about 75 to about 10,000. In some examples, the hydrocarbyl group can be an alkyl, an aryl, an alkylaryl, or an acetyl. For example, the hydrocarbyl group can be methyl, ethyl, propyl, butyl, pentyl, isomers thereof, or derivatives thereof.

In one example, the degradable polymer can be or include, but is not limited to, one or more degradable polymeric lactides having the formula:

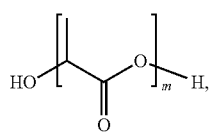

where m can be an integral from 2 to about 75.

In other examples, the degradable polymer can be or include, but is not limited to, one or more degradable polymeric lactides having the formula:

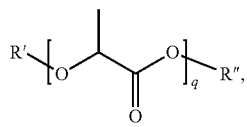

where each R' and R" can independently be a hydrogen or a substituted or unsubstituted linear, branched, cyclic, heterocyclic, or aromatic hydrocarbyl group; R' and R" cannot both be hydrogen; and q can be an integral from 2 to about 75. In some examples, both R' and R" can be saturated and each R' and R" can independently be an alkyl, an aryl, an alkylaryl, or an acetyl. In other examples, each R' and R" can independently be methyl, ethyl, propyl, butyl, pentyl, isomers thereof, or derivatives thereof.

In one or more embodiments, the degradable particles of the FCM 220A can be or include, but are not limited to, one or more anhydrous salts. For example, the degradable particles of the FCM 220A can be or include one or more borates, such as anhydrous sodium tetraborate.

In one or more embodiments, the stimulation treatment slurry 222A can include, but is not limited to, one or more carrier fluids (e.g., such as a fracturing fluid), a FCM (e.g., such as FCM 120, FCM 220A-220D), and the stimulation material 230. Although not shown in FIG. 2, the stimulation treatment slurry 222A can include different stimulation material types, dimensions, etc. For example, the stimulation treatment slurry 222A can include a first proppant and a second proppant where the average particle size of the first proppant can be less than the average particle size of the second proppant, and the first proppant and the second proppant can have different compositions. Further, the average particle size of the FCM 220A can be at least two, three, four, five, or more times greater than the average particle size of the first proppant and/or the second proppant.

The stimulation treatment slurry 222A can include about 0.01 wt %, about 0.03 wt %, about 0.05 wt %, about 0.07 wt %, or about 0.1 wt % to about 0.2 wt %, about 0.3 wt %, about 0.5 wt %, about 0.7 wt %, about 0.9 wt %, or about 1 wt % of the FCM 220A, based on a combined weight of the first proppant and the second proppant. For example, the stimulation treatment slurry 222A can include about 0.01 wt % to about 1 wt %, about 0.03 wt % to about 0.5 wt %, about 0.07 wt % to about 0.2 wt % of the FCM 220A, based on a combined weight of the first proppant and the second proppant.

The stimulation treatment slurry 222A can include about 8 wt %, about 10 wt %, about 12 wt %, or about 15 wt % to about 18 wt %, about 20 wt %, about 22 wt %, or about 25 wt %, based on a combined weight of the first proppant and the second proppant. For example, the stimulation treatment slurry 222A can include about 10 wt % to about 25 wt %, about 12 wt % to about 22 wt %, or about 15 wt % to about 20 wt % of the first proppant, based on a combined weight of the first proppant and the second proppant.

The stimulation treatment slurry 222A can include about 75 wt %, about 78 wt %, about 80 wt %, or about 82 wt % to about 85 wt %, about 88 wt %, about 90 wt %, or about 92 wt % of the second proppant, based on a combined weight of the first proppant and the second proppant. For example, the stimulation treatment slurry 222A can include about 75 wt % to about 90 wt %, about 80 wt % to about 85 wt %, or about 78 wt % to about 88 wt % of the second proppant, based on a combined weight of the first proppant and the second proppant.

In one or more examples, the stimulation treatment slurry 222A can include the carrier fluid 228, about 0.01 wt % to about 1 wt % of the FCM 220A, about 10 wt % to about 25 wt % of a first proppant, and about 75 wt % to about 90 wt % of a second proppant, based on a combined weight of the first proppant and the second proppant. In other examples the stimulation treatment slurry 222A can include the carrier fluid 228, about 0.03 wt % to about 0.5 wt % of the FCM 220A, about 12 wt % to about 22 wt % of the first proppant, and about 78 wt % to about 88 wt % of the second proppant, based on a combined weight of the first proppant and the second proppant. In other examples, the stimulation treatment slurry 222A can include the carrier fluid 228, about 0.05 wt % to about 0.25 wt % of the FCM 220A, about 15 wt % to about 20 wt % of the first proppant, and about 80 wt % to about 85 wt % of the second proppant, based on a combined weight of the first proppant and the second proppant.

In one or more examples, the average particle size of the first proppant can be about 50 to about 250 μm and the average particle size of the second proppant can be greater than 250 to less than 1 mm. In other examples, the average particle size of the first proppant can be about 100 μm to about 200 μm and the average particle size of the second proppant can be about 300 μm to about 850 μm.

The first proppant can be or include, but is not limited to, sand, silica, alumina, or any mixture thereof and the second proppant can be or include, but is not limited to, one or more carbonates, such as calcium carbonate. One source of calcium carbonate can be a ground marble that can have an average particle size of about 30 mesh and about 50 mesh, such as 30-50 White particles, commercially available from Imerys Carbonates.

The stimulation treatment slurry 222A can include, but is not limited to, about 200 wt % to about 1,000 wt % of the carrier fluid 228, based on the combined weight of the first proppant and the second proppant. For example, the stimulation treatment slurry 222A can include about 350 wt % to about 700 wt % of the carrier fluid 228, based on the combined weight of the first proppant and the second proppant. In some examples, the carrier fluid 228 can include water, a salt or brine, a crosslinked fluid, a linear gel, a gelling agent, a mineral acid, an organic acid, an organic solvent, a fluidized nitrogen, a fluidized carbon dioxide, or any mixture thereof. Each of the fluidized nitrogen and the fluidized carbon dioxide can independently be in a liquid state and/or a supercritical state. In one or more examples, the carrier fluid 228 can include one or more gelling agents. Illustrative gelling agents can be or include, but are not limited to, borate crosslinked fluids that contains water, a guar or hydroxypropyl guar (HPG) gelling agent.

In one or more examples, the stimulation treatment slurry 222A can include the carrier 228, about 0.05 wt % to about 0.25 wt % of the FCM 220A, about 10 wt % to about 25 wt % of the first proppant, and about 75 wt % to about 90 wt % of the second proppant, where the weight percentages of the FCM 220A, the first proppant, and the second proppant are based on a combined weight of the first proppant and the second proppant. In some examples, the average particle size of the first proppant can be less than the average particle size of the second proppant, the first proppant can include sand, silica, alumina, or any mixture thereof, the second proppant can include calcium carbonate, the FCM 220A can consist essentially of or consist of the degradable particles, and the average particle size of the degradable particles can be at least two, three, four, five, or more times greater than the average particle size of the first proppant and/or the second proppant.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

In addition to the embodiments described above, many examples of specific combinations are within the scope of the disclosure, some of which are detailed below:

EXAMPLE 1

A method of fracturing an interval of a subterranean formation to produce fluid from a reservoir through a wellbore, comprising: flowing a treating fluid into the wellbore to create fractures in the formation, selectively flowing a flow constraint material into the wellbore simultaneously with the treating fluid, monitoring a parameter of the formation to determine whether a formation system strain is within a range, adjusting the flow of the flow constraint material when the formation system strain is out of the range, and wherein the flow constraint material partially constrains the treating fluid from entering a fracture so as to at least partially redistribute the treating fluid to an another fracture or fractures.

EXAMPLE 2

The method of example 1, further comprising pausing the flow of the flow constraint material while maintaining the flow of the treating fluid before monitoring the parameter of formation, and maintaining the flow of the flow constraint material when the formation system strain is within the range.

EXAMPLE 3

The method of example 1, further comprising placing the flow constraint material at a near wellbore region of the formation to partially constrain the treating fluid from entering at least one of the fractures.

EXAMPLE 4

The method of example 1, further comprising manipulating a characteristic of the flow constraint material to partially constrain the treating fluid from entering a fracture; and wherein the characteristic comprises at least one of input timing, dimensions, distribution, and flow rate.

EXAMPLE 5

The method of example 1, wherein monitoring the parameter of the formation comprises measuring a bottom-hole pressure of the wellbore, wherein the bottom-hole pressure comprises a force applied to the formation to fracture the formation.

EXAMPLE 6

The method of example 5, further comprising managing the bottom-hole pressure to maintain the partial constraining of the treating fluid.

EXAMPLE 7

The method of example 5, further comprising managing the bottom-hole pressure to be within a range relative to in-situ Young's modulus conditions.

EXAMPLE 8

The method of example 7, wherein the in-situ Young's modulus conditions are utilized against treatment bottom-hole pressure to maintain the cycle on cycle formation system strain to a range of about 0.0003 or less.

EXAMPLE 9

The method of example 1, further comprising flowing additional cycles of the flow constraint material into the wellbore while maintaining the formation parameter within the range.

EXAMPLE 10

The method of example 1, further comprising inputting at least one cycle of the flow constraint material per a formation entry point.

EXAMPLE 11

The method of example 1, further comprising maintaining a cumulative flow rate of the treating fluid and the flow constraint material into the wellbore.

EXAMPLE 12

The method of example 1, further comprising: flowing the flow constraint material with a stimulation material at a surface of the wellbore to a fracture without performing a full wellbore flush, and starting another flow of the stimulation material prior to displacing the launched flow constraint material to the fracture.

EXAMPLE 13

The method of example 12, further comprising only performing the full wellbore flush upon completion of a mass balance of the treating fluid to the interval.

EXAMPLE 14

The method of example 1, wherein the treating fluid comprises a carrier fluid or the carrier fluid and a stimulation material.

EXAMPLE 15

The method of example 14, further comprising flowing the stimulation material into the wellbore at either a constant flow rate or a variable flow rate.

EXAMPLE 16

The method of example 14, further comprising stopping the flow of the stimulation material while continuing to flow the flow constraint material.

EXAMPLE 17

The method of example 14, wherein the partially constraining balances a distribution of the carrier fluid or a distribution of the carrier fluid and the stimulation material among high flow capacity fractures and low flow capacity fractures.

EXAMPLE 18

A system for fracturing a subterranean formation to produce fluid from a formation through a wellbore, comprising: injection equipment configured to inject a treating fluid and to selectively and simultaneously inject a flow constraint material into the wellbore, the treating fluid being flowable into the formation to create at least one fracture in the formation; a monitoring unit in communication with the wellbore and configured to monitor a parameter of the formation after injecting the flow constraint material to determine if a formation system strain is within a range; and wherein the flow constraint material is configured to partially constrain the treating fluid from entering a fracture so as to distribute the treating fluid to another fracture.

EXAMPLE 19

The system of example 18, the monitoring unit further being in communication with and configured to control the injection equipment to cease the flow of the flow constraint material in response to the formation system strain being out of the range.

EXAMPLE 20

The system of example 18, wherein the treating fluid comprises at least one of a friction reduced water, completion brine, linear gel, crosslinked fluid, acid, non-aqueous fluid, fluid commingled with or without carbon dioxide and/or nitrogen ($N_2$), or another fluid capable of carrying the flow constraint material.

EXAMPLE 21

The system of example 18, wherein the treating fluid comprises a stimulation material comprising at least one of proppant particulates and conductivity enhancement materials.

EXAMPLE 22

The system of example 21, wherein a dimension of the stimulation material is based on geo-mechanical conditions of the formation.

EXAMPLE 23

The system of example 22, wherein a dimension of the flow constraint material is based on the dimension for the stimulation material relative to the geo-mechanical conditions of the formation.

EXAMPLE 24

The system of example 21, wherein the flow constraint material comprises a defined particle size distribution relative to the stimulation material within the treating fluid.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of fracturing an interval of a subterranean formation to produce fluid from a reservoir through a wellbore, comprising:
    flowing a treating fluid into the wellbore to create fractures in the formation;
    placing a flow constraint material at a near wellbore region of the formation;
    selectively flowing the flow constraint material into the wellbore simultaneously with the treating fluid;
    monitoring a parameter of the formation to determine whether a formation system strain is within a range;
    adjusting the flow of the flow constraint material when the formation system strain is out of the range; and
    wherein the flow constraint material partially constrains the treating fluid from entering a fracture so as to at least partially redistribute the treating fluid to another fracture or fractures.

2. The method of claim 1, further comprising:
    pausing the flow of the flow constraint material while maintaining the flow of the treating fluid before monitoring the parameter of the formation; and
    maintaining the flow of the flow constraint material when the formation system strain is within the range.

3. The method of claim 1, further comprising:
    manipulating a characteristic of the flow constraint material to partially constrain the treating fluid from entering a fracture; and
    wherein the characteristic comprises at least one of input timing, dimensions, distribution, and flow rate.

4. The method of claim 1, wherein monitoring the parameter of the formation comprises measuring a bottom-hole pressure of the wellbore, wherein the bottom-hole pressure comprises a force applied to the formation to fracture the formation.

5. The method of claim 4, further comprising managing the bottom-hole pressure to maintain partial constraining of the treating fluid.

6. The method of claim 4, further comprising managing the bottom-hole pressure to be within a range relative to in-situ Young's modulus conditions.

7. The method of claim 6, wherein the in-situ Young's modulus conditions are utilized against treatment bottom-hole pressure to maintain the cycle on cycle formation system strain to a range of about 0.0003 or less.

8. The method of claim 1, further comprising flowing additional cycles of the flow constraint material into the wellbore while maintaining the formation parameter within the range.

9. The method of claim 1, further comprising inputting at least one cycle of the flow constraint material per a formation entry point.

10. The method of claim 1, further comprising maintaining a cumulative flow rate of the treating fluid and the flow constraint material into the wellbore.

11. The method of claim 1, further comprising:
    flowing the flow constraint material with a stimulation material at a surface of the wellbore to a fracture without performing a full wellbore flush; and
    starting another flow of the stimulation material prior to displacing the launched flow constraint material to the fracture.

12. The method of claim 11, further comprising only performing the full wellbore flush upon completion of a mass balance of the treating fluid to the interval.

13. The method of claim 1, wherein the treating fluid comprises a carrier fluid or the carrier fluid and a stimulation material.

14. The method of claim 13, further comprising flowing the stimulation material into the wellbore at either a constant flow rate or a variable flow rate.

15. The method of claim 13, further comprising stopping the flow of the stimulation material while continuing to flow the flow constraint material.

16. The method of claim 13, wherein partially constraining balances a distribution of the carrier fluid or a distribution of the carrier fluid and the stimulation material among high flow capacity fractures and low flow capacity fractures.

17. A system for fracturing a subterranean formation to produce fluid from a formation through a wellbore, comprising:
    injection equipment configured to inject a treating fluid and to selectively and simultaneously inject a flow constraint material into the wellbore, the treating fluid being flowable into the formation to create at least one fracture in the formation and the flow constraint material being placed at a near wellbore region of the formation;
    a monitoring unit in communication with the wellbore and configured to monitor a parameter of the formation after injecting the flow constraint material to determine if a formation system strain is within a range; and
    wherein the flow constraint material is configured to partially constrain the treating fluid from entering a fracture so as to distribute the treating fluid to another fracture.

18. The system of claim 17, the monitoring unit further being in communication with and configured to control the injection equipment to cease the flow of the flow constraint material in response to the formation system strain being out of the range.

19. The system of claim 17, wherein the treating fluid comprises at least one of a friction reduced water, completion brine, linear gel, crosslinked fluid, acid, non-aqueous fluid, fluid commingled with or without carbon dioxide and/or nitrogen ($N_2$), or another fluid capable of carrying the flow constraint material.

20. The system of claim 17, wherein the treating fluid comprises a stimulation material comprising at least one of proppant particulates and conductivity enhancement materials.

21. The system of claim 20, wherein a dimension of the stimulation material is based on geo-mechanical conditions of the formation.

22. The system of claim 21, wherein a dimension of the flow constraint material is based on the dimension for the stimulation material relative to the geo-mechanical conditions of the formation.

23. The system of claim 20, wherein the flow constraint material comprises a defined particle size distribution relative to the stimulation material within the treating fluid.

* * * * *